(12) United States Patent
Martinez

(10) Patent No.: US 11,160,355 B2
(45) Date of Patent: Nov. 2, 2021

(54) SYSTEMS, APPARATUS, AND METHODS FOR AMBULATORY USE OF DRINKING CONTAINERS

(71) Applicant: Eleazar Angel Martinez, Houston, TX (US)

(72) Inventor: Eleazar Angel Martinez, Houston, TX (US)

( * ) Notice: Subject to any disclaimer, the term of this patent is extended or adjusted under 35 U.S.C. 154(b) by 0 days.

(21) Appl. No.: 16/244,927

(22) Filed: Jan. 10, 2019

(65) Prior Publication Data

US 2019/0210504 A1 Jul. 11, 2019

Related U.S. Application Data

(60) Provisional application No. 62/615,846, filed on Jan. 10, 2018, provisional application No. 62/703,509, filed on Jul. 26, 2018.

(51) Int. Cl.
| | | |
|---|---|---|
| *A45F 5/02* | (2006.01) | |
| *B60N 3/10* | (2006.01) | |
| *B60R 11/00* | (2006.01) | |
| *B60R 7/04* | (2006.01) | |
| *A45F 3/16* | (2006.01) | |
| *A45F 3/18* | (2006.01) | |

(52) U.S. Cl.
CPC .............. *A45F 5/021* (2013.01); *B60N 3/101* (2013.01); *B60N 3/103* (2013.01); *A45F 3/16* (2013.01); *A45F 3/18* (2013.01); *B60R 7/04* (2013.01); *B60R 2011/0056* (2013.01); *B60R 2011/0057* (2013.01); *B60R 2011/0059* (2013.01)

(58) Field of Classification Search
CPC ... A45F 3/16; A45F 3/18; A45F 5/021; B60R 7/04; B60R 2011/0056; B60R 2011/0057; B60R 2011/0059
See application file for complete search history.

(56) References Cited

U.S. PATENT DOCUMENTS

| | | | | |
|---|---|---|---|---|
| 2,926,879 | A | * | 3/1960 | Dietrich .................. A47J 45/00 248/311.2 |
| 3,840,204 | A | * | 10/1974 | Thomas .................. B60N 3/083 248/311.2 |
| 4,325,503 | A | * | 4/1982 | Swinney .................... A45F 5/02 224/148.4 |
| D272,775 | S | * | 2/1984 | Weissenburger .......... 224/148.7 |
| 4,697,780 | A | * | 10/1987 | Wenkman .............. B60N 3/103 248/558 |
| 4,865,237 | A | * | 9/1989 | Allen .................. A47G 23/0225 224/552 |
| 4,878,642 | A | * | 11/1989 | Kirby, Jr. .................. A47K 1/08 248/311.2 |
| 5,014,956 | A | * | 5/1991 | Kayali .................... B60N 3/102 248/311.2 |
| 5,056,696 | A | * | 10/1991 | Lahr ........................ A45F 5/021 224/148.4 |
| 5,232,137 | A | * | 8/1993 | Devine ..................... A45F 5/02 222/175 |
| D347,941 | S | * | 6/1994 | Minx .......................... D12/411 |

(Continued)

*Primary Examiner* — Eret C McNichols
(74) *Attorney, Agent, or Firm* — Alberto Q. Amatong, Jr.; Amatong McCoy LLC

(57) ABSTRACT

A holster assembly for use in retaining liquid containers includes a holster clip and a holster cup holder. The holster clip and the holster cup holder are configured to be selectively attached and detached from one another.

20 Claims, 6 Drawing Sheets

(56) References Cited

U.S. PATENT DOCUMENTS

| | | | | |
|---|---|---|---|---|
| 5,573,214 A * | 11/1996 | Jones | ............... | B60N 3/103 248/205.5 |
| 5,655,742 A * | 8/1997 | Whitman | ............... | B60N 3/103 248/311.2 |
| 5,833,194 A * | 11/1998 | Jones | ............... | B60N 3/106 248/311.2 |
| 5,857,601 A * | 1/1999 | Greenwood | ............... | B62B 9/26 224/409 |
| 6,045,017 A * | 4/2000 | Connell | ............... | A45F 5/02 224/148.4 |
| 6,318,689 B1 * | 11/2001 | Rodriguez | ............... | A47G 23/0225 248/205.5 |
| 6,390,427 B1 * | 5/2002 | McConnell | ............... | B60N 3/103 248/228.3 |
| 6,427,959 B1 * | 8/2002 | Kalis | ............... | H04M 1/04 248/288.11 |
| 6,888,940 B1 * | 5/2005 | Deppen | ............... | B60R 11/0241 379/446 |
| 6,913,232 B2 * | 7/2005 | Richter | ............... | F16B 47/006 248/205.5 |
| 6,983,918 B1 * | 1/2006 | Leasure | ............... | A63B 55/00 248/311.2 |
| 7,077,302 B2 * | 7/2006 | Chuang | ............... | B62J 11/00 224/271 |
| 7,162,281 B2 * | 1/2007 | Kim | ............... | A45F 5/02 224/196 |
| 7,748,583 B1 * | 7/2010 | Woltman | ............... | A45D 20/12 224/251 |
| 8,033,518 B2 * | 10/2011 | Schuchman | ............... | B60N 3/103 224/679 |
| 8,245,892 B2 * | 8/2012 | Kriner | ............... | A44B 11/005 224/163 |
| D670,157 S * | 11/2012 | Mo | ............... | D8/363 |
| 8,919,622 B1 * | 12/2014 | Gabriel | ............... | A45F 5/021 224/148.4 |
| 8,981,962 B2 * | 3/2015 | Fu | ............... | B60R 11/02 340/901 |
| 9,027,807 B2 * | 5/2015 | Kampas | ............... | A45F 5/00 224/148.4 |
| D733,116 S * | 6/2015 | Aspinall | ............... | A44B 11/005 D14/253 |
| 9,427,070 B1 * | 8/2016 | Bastian | ............... | A45F 5/021 |
| 9,944,209 B1 * | 4/2018 | Carnevali | ............... | F16M 11/2028 |
| 9,950,731 B2 * | 4/2018 | Kim | ............... | F16B 2/12 |
| D825,545 S * | 8/2018 | McSweyn | ............... | D14/253 |
| 10,278,527 B2 * | 5/2019 | Hayward | ............... | A47G 23/0225 |
| 10,472,117 B1 * | 11/2019 | Meyer | ............... | A45F 5/021 |
| 2001/0032866 A1 * | 10/2001 | Gagne | ............... | A45F 5/02 224/148.4 |
| 2002/0020730 A1 * | 2/2002 | Baird | ............... | A45F 5/021 224/665 |
| 2003/0024959 A1 * | 2/2003 | Armstrong | ............... | A45F 5/02 224/148.4 |
| 2003/0085244 A1 * | 5/2003 | Parsons | ............... | A45F 5/02 224/197 |
| 2007/0235481 A1 * | 10/2007 | Parsons | ............... | A45F 5/021 224/197 |
| 2007/0278266 A1 * | 12/2007 | Parsons | ............... | F41C 33/045 224/197 |
| 2008/0023606 A1 * | 1/2008 | Kalis | ............... | F16M 13/022 248/288.31 |
| 2008/0047997 A1 * | 2/2008 | Mayfield | ............... | A45F 5/02 224/669 |
| 2008/0209698 A1 * | 9/2008 | Colorado | ............... | A45F 5/02 24/595.1 |
| 2009/0120979 A1 * | 5/2009 | Martinez | ............... | A45F 5/021 224/199 |
| 2009/0229292 A1 * | 9/2009 | Sweeney | ............... | A45F 5/02 62/259.3 |
| 2010/0090078 A1 * | 4/2010 | Vanek | ............... | A47G 23/0216 248/311.2 |
| 2010/0219217 A1 * | 9/2010 | Andochick | ............... | A45F 5/02 224/250 |
| 2010/0264177 A1 * | 10/2010 | Clifton, Jr. | ............... | A45F 5/02 224/269 |
| 2010/0294816 A1 * | 11/2010 | Sentell | ............... | A45F 5/021 224/148.3 |
| 2010/0301053 A1 * | 12/2010 | Willis | ............... | A47G 23/0216 220/560 |
| 2011/0192857 A1 * | 8/2011 | Rothbaum | ............... | F16M 11/041 220/694 |
| 2011/0240493 A1 * | 10/2011 | Adams | ............... | A45C 13/1069 206/216 |
| 2011/0247994 A1 * | 10/2011 | Siciliano | ............... | B65D 23/12 215/395 |
| 2012/0037673 A1 * | 2/2012 | Chen | ............... | A45C 11/00 224/191 |
| 2012/0211629 A1 * | 8/2012 | Shaw | ............... | A47G 23/0216 248/346.03 |
| 2012/0228293 A1 * | 9/2012 | Combs | ............... | A45F 5/02 220/200 |
| 2013/0168429 A1 * | 7/2013 | Pearce | ............... | A45F 5/021 224/676 |
| 2014/0346295 A1 * | 11/2014 | Song | ............... | F16B 47/00 248/205.8 |
| 2014/0346821 A1 * | 11/2014 | Flis | ............... | A45F 5/00 297/188.04 |
| 2015/0157002 A1 * | 6/2015 | Paquette | ............... | A01K 97/05 43/56 |
| 2016/0051037 A1 * | 2/2016 | Ballard | ............... | A45F 5/021 224/269 |
| 2016/0236857 A1 * | 8/2016 | Adams | ............... | B65D 25/20 |
| 2017/0129650 A1 * | 5/2017 | Karas | ............... | A45F 3/16 |
| 2017/0235211 A1 * | 8/2017 | Eynav | ............... | G03B 17/566 396/423 |
| 2017/0251794 A1 * | 9/2017 | Kostal | ............... | F16B 2/22 |
| 2018/0289137 A1 * | 10/2018 | Goldman | ............... | A45F 3/005 |
| 2019/0160860 A1 * | 5/2019 | Clarke | ............... | A45F 5/021 |
| 2019/0166984 A1 * | 6/2019 | Wall | ............... | A45F 5/021 |
| 2020/0002006 A1 * | 1/2020 | Slack, Jr. | ............... | A47G 29/093 |

* cited by examiner

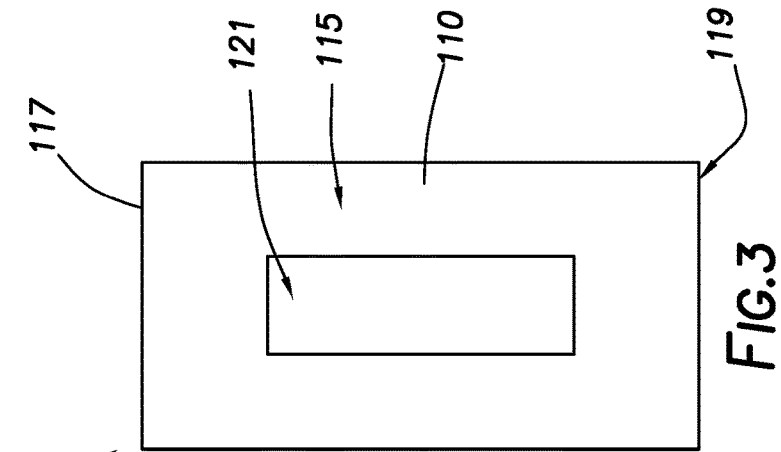
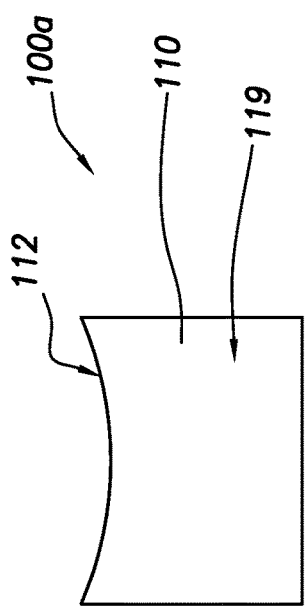
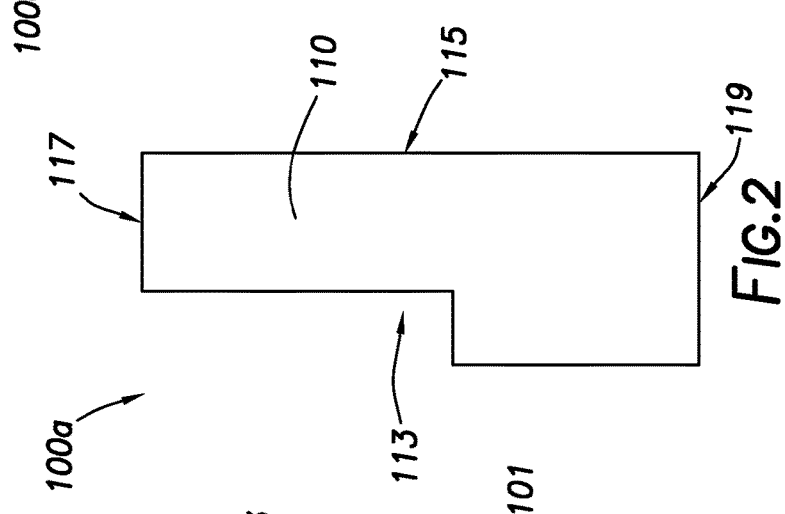
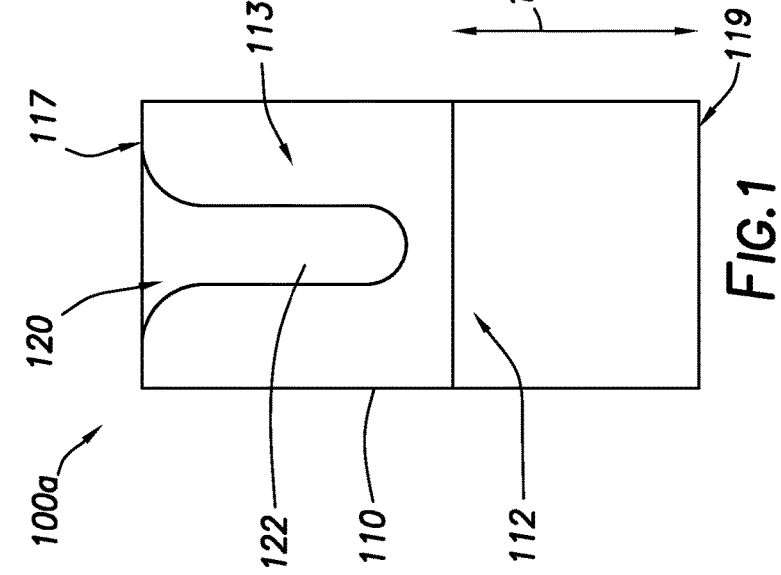
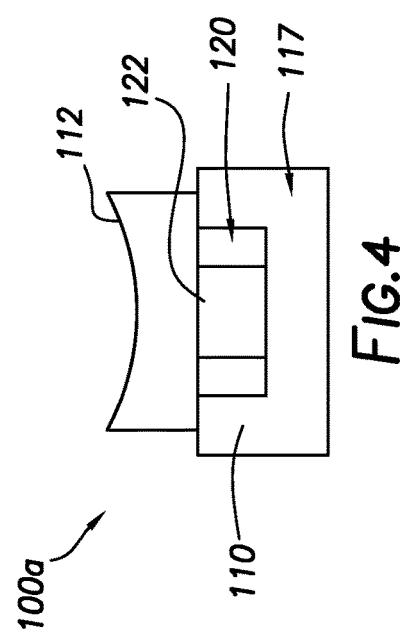

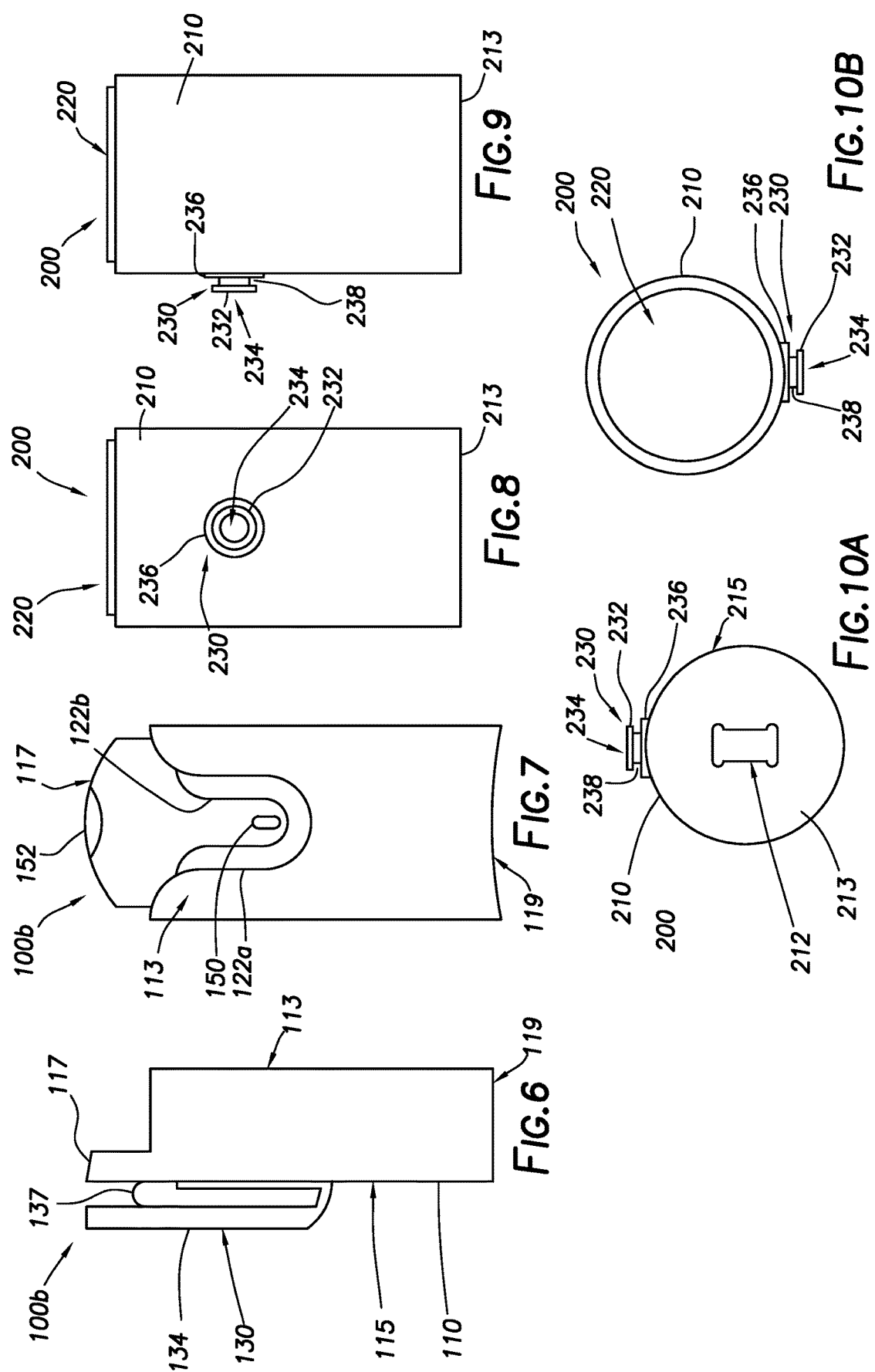

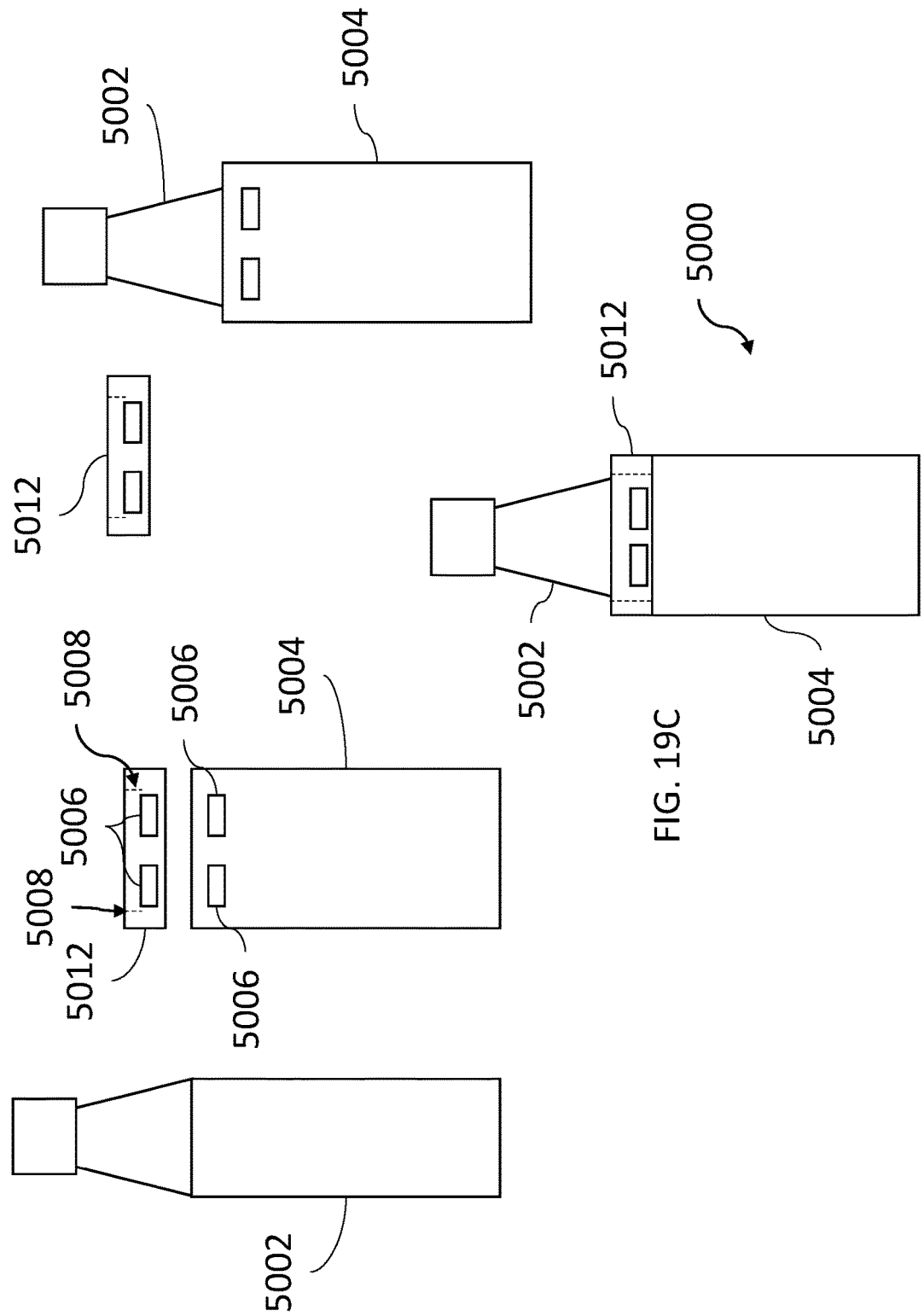

SYSTEMS, APPARATUS, AND METHODS FOR AMBULATORY USE OF DRINKING CONTAINERS

CROSS-REFERENCE TO RELATED APPLICATIONS

This application claims the benefit of U.S. Provisional Patent Application No. 62/615,846, filed on Jan. 10, 2018, and entitled "Holster for Cans, Bottles, and Tumblers", the entirety of which is incorporated herein by reference. This application also claims the benefit of U.S. Provisional Patent Application No. 62/703,509, filed on Jul. 26, 2018, and entitled "Systems, Apparatus, and Methods for Ambulatory Use of Drinking Containers", the entirety of which is incorporated herein by reference.

FIELD

The present disclosure relates to systems, apparatus, and methods for ambulatory use of drinking containers.

BACKGROUND

Consumption of liquids forms an important part of a person's daily routine for providing personal enjoyment, simulative effects (e.g., drinking coffee in the morning), and maintaining a healthy level of hydration. Drinks are typically packaged in cans, bottles, or the like. Often, users will contain hot liquids, such as hot coffee, within tumblers for consumption.

Many users are mobile during at least a portion of the day, such as during work hours. For example, some users, such as mechanics or labor contractors, often move about frequently while working. For some such users, keeping a drink with them for consumption is challenging, as they may set the drink down at a first location of work, and must then remember to (and be capable of) bringing the drink with them when moving to a second location of work.

BRIEF SUMMARY

One aspect of the present disclosure includes a holster assembly for use in retaining liquid containers. The holster assembly includes a holster. The holster includes a first coupler on a front side thereof. The assembly includes a holster cup holder. The holster cup holder includes a second coupler. The first coupler and the second coupler are selectively attachable and detachable from one another.

Another aspect of present disclosure includes a holster assembly for use in retaining liquid containers. The holster assembly includes a holster. The holster includes a slot and slot track on a front side thereof. The assembly includes a holster cup holder. The holster cup holder includes a tab on an outer surface thereof. The tab is selectively attachable and detachable from within the slot and slot track. A magnetic surface on a back side of the holster is selectively attachable and detachable onto an external structure. The holster includes a body having a mating surface formed thereon. The mating surface is sized and shaped to mate with the outer surface of the cup holder. A holster mount is selectively attachable and detachable with the holster. The holster mount includes a suction cup or magnet for coupling with external surfaces.

Another aspect of present disclosure includes a holster assembly for use in retaining liquid containers. The holster assembly includes a holster. The holster includes a slot and slot track on a front side thereof. The assembly includes a holster cup holder, including a tab on an outer surface thereof. The tab is selectively attachable and detachable from within the slot and slot track. A magnetic surface on a back side of the holster is selectively attachable and detachable onto an external structure. The holster includes a body having a mating surface formed thereon. The mating surface sized and shaped to mate with the outer surface of the cup holder.

BRIEF DESCRIPTION OF THE DRAWINGS

So that the manner in which the features and advantages of the system, products, and/or method so of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1 is a front view of a holster;
FIG. 2 is a side view of a holster;
FIG. 3 is a back view of a holster;
FIG. 4 is a top view of a holster;
FIG. 5 is a bottom view of a holster;
FIG. 6 is another side view of a holster;
FIG. 7 is another front view of a holster;
FIG. 8 is a side view of a cup holder;
FIG. 9 is another side view of a cup holder;
FIG. 10A is a bottom view of a cup holder;
FIG. 10B is a top view of a cup holder;
FIGS. 19A-19C depict a holster cup holder and retention ring assembly.

Figure 12:
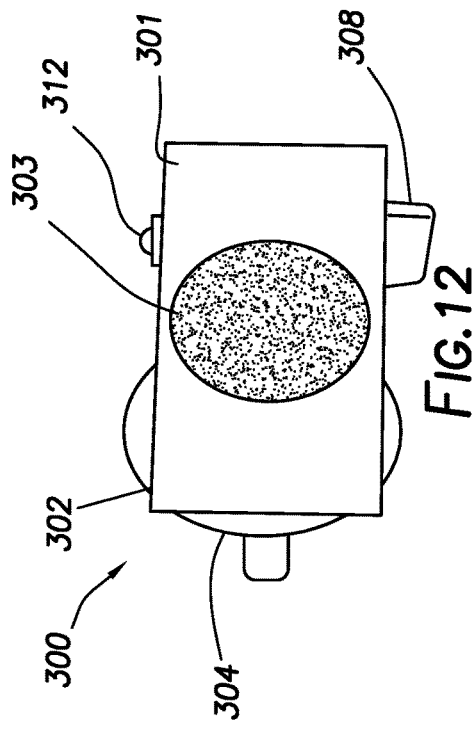
FIG. 12 is a front view of a mount.

Products and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

The present application is related to U.S. Provisional Patent Application No. 62/615,846 (the '846 provisional application), entitled "Holsters for Cans, Bottles, and Tumblers", filed on Jan. 10, 2018, the entirety of which is incorporated herein by reference and made a part of the present disclosure. The present application is also related to U.S. Provisional Patent Application No. 62/703,509 (the '509 provisional application), filed on Jul. 26, 2018, and entitled "Systems, Apparatus, and Methods for Ambulatory Use of Drinking Containers", the entirety of which is incorporated herein by reference.

Certain aspects of the present disclosure include a holster assembly for use in retaining liquid containers, such as cups, cans, bottles, tumblers, mugs, or the like. The liquid contained within the liquid containers may be, for example and without limitation, water, beer, coffee, soda, juice, milk, or any consumable liquid. In some aspects, the holster assembly is configured to be worn by a user in such a manner that the user is able to remain ambulatory while wearing the holster assembly without spilling the liquid contained within the liquid container. For example, the holster assembly may be configured to be selectively attached and detached onto a belt loop, a belt, or another portion of clothing or accessory worn by the user.

Holster

In some aspects, the systems and apparatus disclosed herein include a holster configured to couple with a cup or cup holder, and to couple with another structure, such as a belt loop or other clothing structure, a wall or other surface, or a holster mount (as described in more detail herein). The holsters disclosed herein are not limited to the particular structures shown in the Figures, and may be any structure configured to couple with a cup or cup holder and with another structure, retain the cup or cup holder, and to maintain the cup or cup holder in a desired position.

With reference to FIGS. 1-5, one embodiment of a holster is shown, holster 100a. Holster 100a includes holster body 110. Mating surface 112 is formed on front side 113 of holster body 110. Mating surface 112 is a contoured surface having a curvature configured to mate with the outer surface of a cup or cup holder (e.g., a sleeve of a cup holder). As shown, mating surface 112 is a concave surface that is shaped and sized to mate with a convex surface. However, the mating surfaces disclosed herein may have other shapes and sizes, depending on the cup or cup holder.

Holster 100a includes a first coupling structure configured to couple with a cup or cup holder. The first coupling structure is shown and described as including a slot and slot track for engaging with a tab of a cup or cup holder. However, the coupling structures disclosed herein are not limited to this particular structure, and may be or include other structures configured to mate and/or couple with cups or cup holders. Holster 100a includes slot 120 and slot track 122 on front side 113. Slot 120 and slot track 122 are configured (e.g., shaped, sized, positioned, and/or arranged) to engage with a tab or other structure of a cup or cup holder for selectively coupling and decoupling holster 100a with a cup or cup holder. As shown in FIG. 4, slot 120 is a cavity formed within holster body 110 with an opening on top end 117 of holster body 110. Slot track 122 is a track defined by an opening into the cavity of slot 120 that is narrower than the cavity. Slot track 122 extends from or proximate to top end 117 towards bottom end 119. As shown, slot track 122 extends less than an entirety of the height of holster body 110, where the height of holster body 110 is defined as the distance from top end 117 to bottom end 119. Slot track 122 terminates above contoured surface 112.

Holster 100a includes a second coupling structure configured to couple with another structure, such as an item of clothing, a wall, a table, or another surface. The second coupling structure is shown and described as including a magnet or a clip for engaging with belt loop or a magnetic surface, respectively. However, the second coupling structures disclosed herein are not limited to these particular structures, and may be or include other structures configured to mate and/or couple with other structures. Holster 100a includes magnetic surface 121 (e.g., a metal plate) on back side 115. Magnetic surface 121 functions to allow holster 100a to be attached to an opposing magnetic surface, such a metal wall, metal table, car, metal bench, or any other magnetic surface. During use, when a cup or cup holder is attached with holster 100a, a user may temporarily store a drink by attaching magnetic surface 121 of holster 100a with an opposing magnetic surface. For example, a mechanic working on vehicle may attach magnetic surface 121 to the vehicle or to an adjacent metal work bench or table. Thus, certain embodiments of the present disclosure include providing for magnetic attachment of the holster to magnetic surfaces. Magnetic surface 121 may be embedded within holster body 110, or coupled with holster body 110 in any manner. Magnetic surface 121 may be attached to any magnetic surface, such as a refrigerator, a car, or any other magnetic structure. In operation, a user may attach the magnetic holster 100a onto a magnetic object, and then attach a holster cup holder with a beverage container to the magnetic holster 100a. As such, a user may securely position a beverage within a holster cup holder at any location with a magnetic surface, including locations where a flat surface, such as a table, is not available.

In certain aspects, holster 100a, when coupled with a beverage container, has a relatively large contact surface area that is engaged with the beverage container. For example, holster 100a may have a relatively large contact surface area (mating surface 112) that is in contact with a cup or cup holder when coupled therewith. For example, the height of mating surface 112 (i.e., the linear extent of mating surface 112 along the direction 101) may be equal to at least 50%, or at least 60%, or at least 70%, or at least 80%, or at least 90%, or at least 95, or at least 99%, or 100% a total height of holster 100a, where the height of total holster 100a is defined as the distance from top end 117 to bottom end 119. In operation, the increased surface area contact between the holster and the beverage cup or cup holder results in a more stable engagement there-between, which reduces or eliminates the occurrence of the beverage container moving relative to the holster (e.g., tipping). This stability can prevent spillage of the beverage and prevent disturbance of the beverage (e.g., shaking of the beverage), which can, for carbonated beverages, result in a "flattening" of the beverage.

Figure 15:
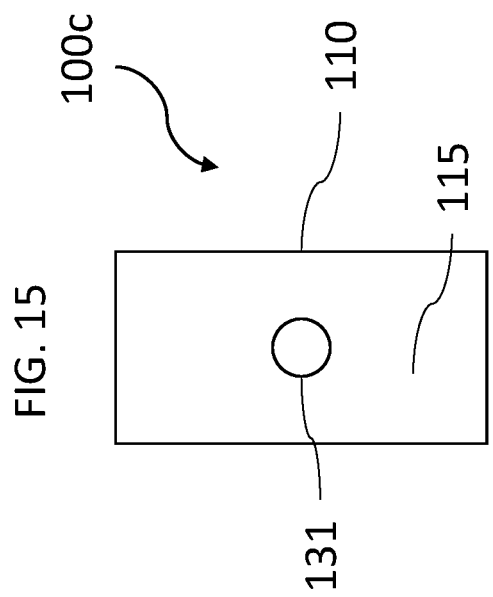
FIG. 15 is another back view of a holster.

In certain aspects of the present disclosure, the holsters are threadedly attachable to other structures (e.g., as shown in FIGS. 39A and 39B of the '509 provisional application). With reference to FIG. 15, in such aspects, instead of or in addition to magnetic surface 121, threaded hole 131 is formed on back side 115 of holster 100c for coupling with threaded objects.

Figure 16:
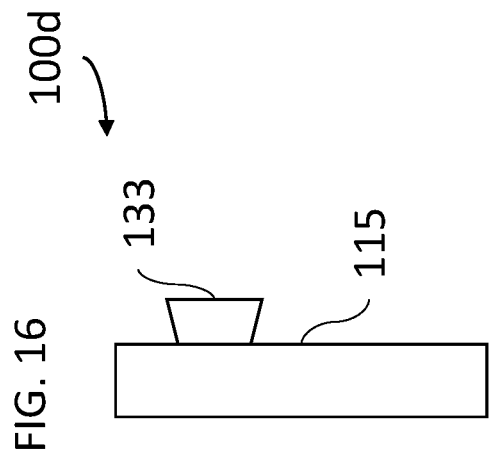
FIG. 16 is another side view of a holster.

In certain aspects, the holsters disclosed herein include a suction cup for attaching the holsters to surfaces suitable for attaching with a suction cup. The suction cup may be instead of or in addition to the magnetic surface 121. One example is shown in FIGS. 41A-41C of the '509 provisional application. FIG. 16 depicts one exemplary holster 100d including suction cup 133 on back side 115 thereof. In operation, a user may attach suction cup 133 to a surface, then attach a holster cup holder thereto, with a beverage container therein. In some such aspects, a locking suction cup is used, such as is shown in FIGS. 42A and 42B of the '509 provisional application. In operation, a user may attach the locking suction cup to a surface, and then lock the suction cup.

The holsters disclosed herein may be single, one-piece, unitary structures.

Holster with Clip

With reference to FIGS. 6 and 7, in some aspects, the second coupling structure is a clip configured to be selectively attached and detached onto a belt loop, a belt, or another portion of clothing or accessory worn by the user. Holster 100b includes clip 130. Clip 130 is configured to be selectively attached and detached onto a belt loop, a belt, or another portion of clothing or accessory worn by the user. Clip 130 includes clip arm 134 pivotably coupled to back side 115 of holster body 110, such as via clip spring 137. Clip spring 137 allows clip arm 134 to pivot away from back side 115 of holster body 110, such that clip arm 134 may be opened to engage about a belt loop, a belt, or another portion of clothing or accessory worn by the user. Once engaged about a belt loop, a belt, or another portion of clothing or accessory worn by the user, clip arm 134 is then pivotable back into engagement with back side 115 of holster body 110, in a closed configuration. Clip 134 is shown in the closed configuration in FIG. 6. As such, holster 100b is attachable to a belt loop, a belt, or another portion of clothing or accessory worn by the user.

While shown and described herein as being attached to clothing or accessories, one skilled in the art would understand that holster 100b is not limited to such use and may be attached to other structures. Furthermore, while shown as a clip, one skilled in the art would understand that holster 100b is not limited to attaching a belt loop, a belt, or another portion of clothing or accessory worn by the user using a clip, and that other structures may be used to attached holster 100b to clothing, accessories, or other structures.

Holster with Locking Tab

In some aspects, the first coupling structure of the holsters disclosed herein include a locking feature configured to lockingly engaged with a tab or other structure of a cup or cup holder, such that engagement therebetween may be secured. With reference to FIG. 7, holster 100b includes slot track 122a for receipt of a tab or other structure of a cup or cup holder, and inner slot track 122b. Positioned within inner slot track 122b is locking tab 150. Locking tab 150 is configured to lockingly engage with a portion of a cup or cup holder, such as with a detent within a tab thereof. Locking clip 150 may be positioned, sized, shaped, and/or arranged within slot track 122b such that when a tab (e.g., 230) or other structure is inserted into slot track 122v, locking clip 150 engages within a tab detent (e.g., 234) or other structure thereof, thus locking holster 100b and a holster cup holder into engagement.

In some aspects, holster 100b includes a switch, button, or other controller to selectively lock and unlock locking tab 150 from a cup or cup holder. As shown, holster 100b includes switch 152. When switch 152 is raised (as shown), locking tab 150 is in the locked position. When switch 152 is depressed (not shown), switch 152 forces locking tab 150 into the unlocked position. Switch 152 and locking tab 150 may be coupled via manners well known to those skilled in the art. In operation, a user may depress switch 152, insert a tab or other structure of a cup or cup holder into slot track 122a until a locking feature of the cup or cup holder (e.g., a detent in a tab thereof) engages within locking tab 150, then allow switch 152 to raise to lock locking tab 150 into the locking feature of the cup or cup holder.

Switch 152 may be engaged with locking clip 150, such that locking clip 150 is responsive to movement of switch 152. When clip switch 152 is depressed, locking clip 150 recedes into holster body 110, disengaging from within any tab detent coupled therewith, thus unlocking holster 100b from the associated holster cup holder. When switch 152 is not depressed, locking clip 150 extends out of holster body 110 and into slot track 122b, engaging within any tab detent positioned therein, thus locking holster 100b with a holster cup holder.

In some aspects, rather than a locking tab and detent, a magnetic surface is disposed within slot 120 and is configured to magnetically mate with an opposing magnetic surface on a tab or other structure of a cup or cup holder. The opposing magnetic surfaces may be positioned, sized, and arranged such that when the tab or other structure of the cup or cup holder is inserted into the slot track, the opposing magnetic surfaces magnetically engaged one another, thus retaining holster 100b and holster cup holder in engagement with one another.

Cup or Cup Holder

With reference to FIGS. 8-10B, holster cup holder 200 is shown. While shown and descried as a cup holder, holster cup holder 200 may, itself, be a cup rather than a structure for holding a cup. Holster cup holder 200 includes sleeve 210. Sleeve 210 may define cavity 220. Cavity 220 may be a space within which liquid is stored, or may be a receptacle space for receipt of a container that, itself, contains liquid. Sleeve 210 has outer surface 215 having a curvature that is configured to mate with mating surface 112 of the holsters disclosed herein.

Holster cup holder 200 includes holster coupler configured to couple with the holster disclosed herein. While shown and described as a tab, the holster coupler is not limited to this particular structure, and may be or include other structures capable of coupling with the holsters disclosed herein. Holster cup holder 200 includes tab 230 disposed on sleeve 210. Tab 230 includes tab base 236 coupled (e.g., adhered) to sleeve 210. Tab body 238 extends from tab base 236, and away from sleeve 210. Tab 230 includes tab insert 232 on one end of tab body 238, opposite tab base 236. In some aspects, tab 230, slot 120, and slot track 122 are configured (e.g., shaped, sized, positioned, and/or arranged) such that tab insert 232 is insertable into slot 120. Tab body 238 is then slidable within slot track 122 such that tab insert 232 is positioned behind slot track 122, within the cavity defined by slot 120. As such, the holsters disclosed herein are selectively attachable to holster cup holder 200 when tab 230 is engaged with slot 120 and slot track 122. In some aspects, tab 230 includes tab detent 234, which may be a recess or cavity in the top surface of tab insert 232 configured to engage with a locking mechanism, such as a clip (e.g., locking tab 150) of the holsters disclosed herein.

In some aspects, sleeve 210 is or includes an insulator, such as a fabric or metallic or foam sleeve, for insulation of beverages contained therein. In certain aspects, holster cup holder 200 includes a base opening 212 at base 213 of sleeve 210, opposite the opening into cavity 220. Base opening 212 may a slot or other cavity configured to engage with a tab or other structure for attachment of base 213 of holster cup holder 200 to a surface.

The holster cup holders disclosed herein may be single, one-piece, unitary structures.

Holster Mount

Figure 11:
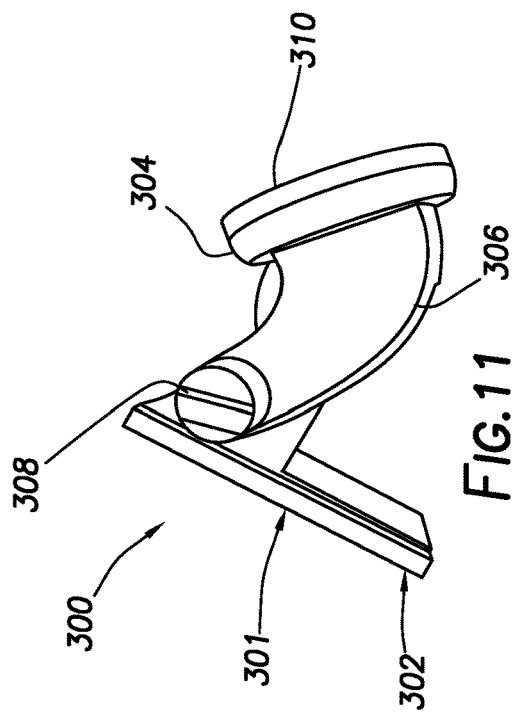
FIG. 11 is a side view of a mount.

With reference to FIGS. 11 and 12, some embodiments include a holster mount. Holster mount 300 includes holster coupler 302 coupled with surface coupler 304 via bracket 306. Holster coupler 302 may be a structure configured to mate and/or couple with the holsters disclosed herein. As shown in FIGS. 11 and 12, holster coupler 302 is a surface 301 including magnetic surface 303. Magnetic surface 303 may couple with magnetic surface 121 for attachment of holster 100a with holster mount 300. However, holster mount 300 is not limited to magnetic coupling with the holsters, and may include a threaded hole, threaded member (e.g., bolt), hook and loop fastener, smooth flat surface (e.g., for attaching with a suction cup), or other structure capable of coupling with one of the holsters disclosed herein.

Holster coupler 302 is pivotably coupled with bracket 306. In some aspects, a position of holster coupler 302, relative to bracket 306, is fixable. For example, lock control 308 (e.g., a knob) may be used to selectively lock and unlock the position of holster coupler 302 relative to bracket 306 by locking the position of holster coupler 302 on pivot axle 312.

Holster mount 300 includes suction cup 310 on surface coupler 304 for attachment of mount 300 to any of a variety of surfaces. Surface coupler 304 is not limited to having a suction cup, and may include other attachment mechanisms, such as hook and loop, threaded attachment, clip, or magnetic attachment.

In operation, a user may attach mount 300 to a surface via suction cup 310 (or other method). The user may then attach a holster to mount 300, pivot the position of the holster about pivot axle 312, and lock the position using lock control 308. As such, a user may use mount 300 at any location where there is a surface with which a suction cup will securely mount. While holster coupler 302 is shown as being pivotable about one axis, pivot axle 312, in other embodiments the holster coupler may pivot about more than one axis (e.g., the holster coupler may couple with the bracket via a ball joint). The ability to position holster coupler 302 relative to surface coupler 304 provides the ability to hold a cup or other liquid container at a position, relative to the force of gravity, such that the liquid does not spill. For example, even if the surface coupler 304 is attached to a surface that is at an angle relative to the force of gravity, the holster coupler 302 may be pivoted such that a holster holding a liquid container is positioned to prevent spillage of the liquid.

The holster mounts disclosed herein may be single, one-piece, unitary structures.

Holster and Holster Mount Assembly

Figure 13:
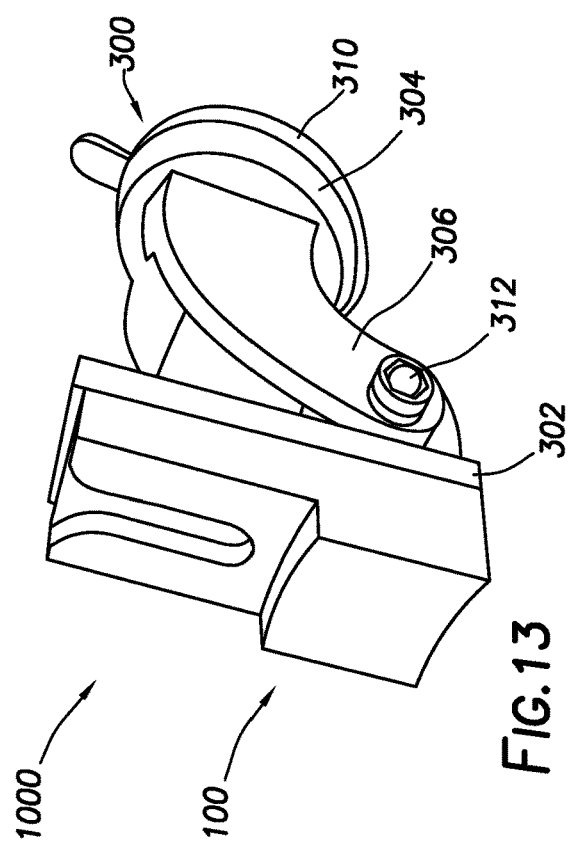
FIG. 13 is a perspective view of a mount coupled with a holster.

With reference to FIG. 13, assembly 1000 includes holster 100 coupled with holster mount 300. Holster 100 may be coupled with holster mount 300 via magnetic force, threaded attachment, suction cups, hook and loop fastener, or another mechanism. Each of holster 100 and holster mount 300 may be a single, one-piece, unitary structure, such that assembly 1000 is a two-piece assembled structure.

Holst, Holster Mount, and Cup or Cup Holder Assembly

Figure 14:
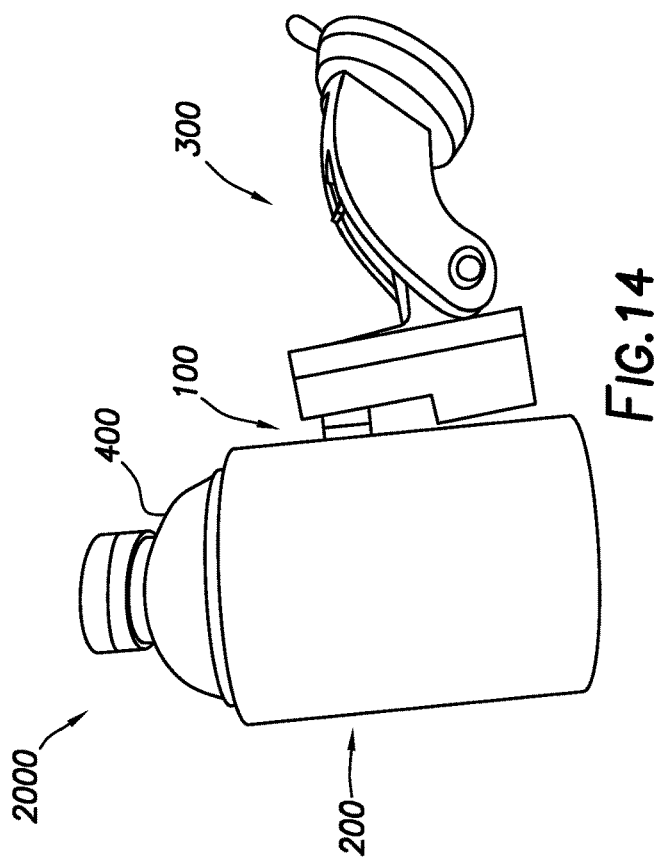
FIG. 14 is a side view of a mount coupled with a holster, with the holster coupled with a cup holder.

With reference to FIG. 14, assembly 2000 includes holster 100 coupled with holster mount 300. Holster 100 may be coupled with holster mount 300 in the same manner described with reference to FIG. 13 or any other manner described herein.

Opposite holster mount 300, holster 100 is also coupled with holster cup holder 200 via any manner described herein. Liquid container 400 is positioned with holster cup holder 200. Each of holster 100, holster mount 300, and holster cup holder 200 may be a single, one-piece, unitary structure, such that assembly 2000 is a three-piece assembled structure (or a four-piece assembled structure when liquid container 400 is considered a part of assembly 2000).

In some aspects, each portion of holster 100, holster cup holder 200, and holster mount 300 may be made of wood, metal, polymer (e.g., plastic and/or rubber), fabric, or any other suitable material or combination of materials.

Bottle with Cap

Figure 17:
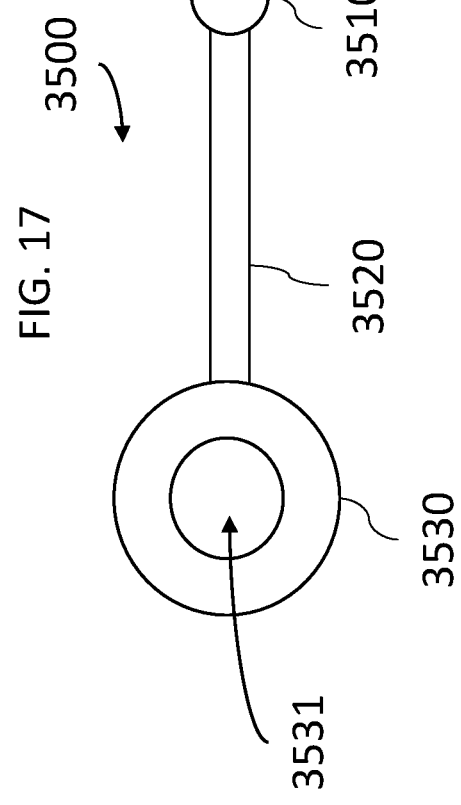
FIG. 17 depicts a bottle cap assembly.

Certain aspects of the present disclosure include a holster assembly configured for holding bottles, such as a glass beer bottle. With reference to FIG. 17, bottle cap assembly 3500 includes ring 3530, which may be coupled about the neck of a bottle as shown in FIGS. 35A and 35B of the incorporated '509 provisional application. Ring 3530 includes hold 3531. Hole 3531 may be placed about the neck of a bottle.

Ring 3530 is coupled with cap 3510 via strap 3520. Cap 3520 may be selectively coupled and decoupled with a bottle opening to selectively close and open the bottle, respectively. In operation, a user can open and close a bottle by removing and attaching cap 3510, respectively. Thus, while bottles, such as the one shown in FIGS. 35A and 35B of the incorporated '509 provisional application, do not typically come with caps that can be easily detached and reattached, bottle cap assembly 3500 allows users to recap such beverages, which prevents spillage and retains freshness of the beverage. Bottle cap assembly 3500 also maintains engagement with the bottle, even when cap 3510 is decoupled from bottom opening.

The bottle cap assemblies disclosed herein may be single, one-piece unitary structures. Assemblies of the bottle cap assembly and a bottle may be two-piece structures (i.e., the bottle and the bottle cap assembly).

Cap to Modify Beverage Can

Figure 18B:
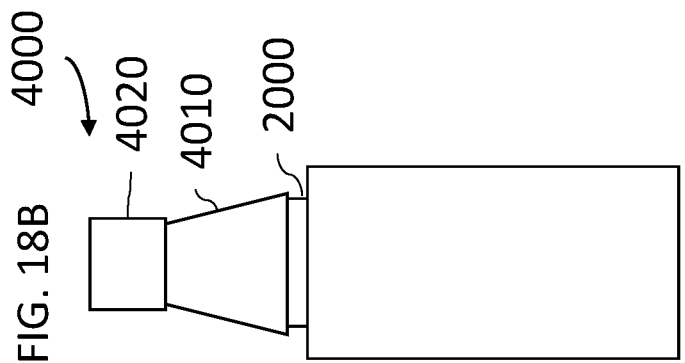
FIGS. 18A and 18B depict an assembly for converting a can into a bottle.
Figure 18A:
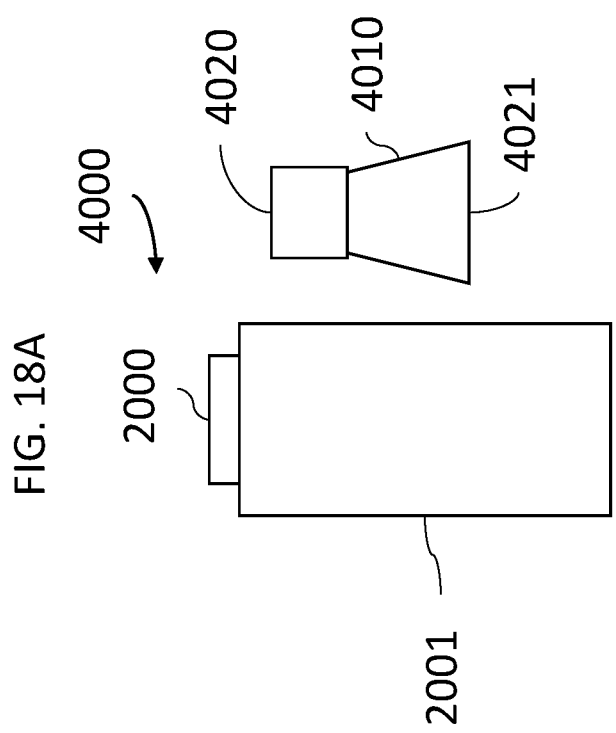

Certain aspects of the present disclosure include a cap configured to modify beverage cans, such as is shown in FIGS. 36A and 36B of the incorporated '509 provisional application. With reference to FIGS. 18A and 18B, cap assembly 4000 includes cover 4010. Cover 4010 is configured (sized and shaped) to fittingly attach with can 2000 at the top of can 2000. As shown, can is contained within an insulator 2001. Base 4021 of cover 4010 may be press fit, snapped, or otherwise fittingly engaged over the top of can 2000. Engagement of cover 4010 with can 2000 may be watertight, such that a user can drink the contents of can 2000 without spilling the contents thereof. Cap assembly 4000 includes cover cap 4020, which is selectively engageable over cover 4010 (e.g., threadably engageable therewith).

In operation, a user can open can 2000, then attach cover 4010, with cap 4020 coupled thereto, onto can 2000. The user can then selectively access the beverage contents of can 2000 for consumption by opening and closing cap 4020. Thus, while cans such as the one shown in FIGS. 18A and 18B cannot typically be reclosed after opening, cap assembly 2000 allows users to recap such beverages, which prevents spillage and retains freshness of the beverage. The structure of the cap assembly is not limited to that shown in FIGS. 18A and 18B. For example, in some aspects, the structure is the same or similar tot hat shown in FIG. 34 of the incorporated '509 provisional application.

The cap assemblies disclosed herein may be two-piece structures, including the cover 4010 and cap 4020. Assemblies of the cap assembly and a can may be three-piece structures (i.e., the cap, cover, and can).

Other Aspects and Variations

In some aspects, a holster cup holder having locking features formed on a surface thereof, is provided, such as is shown in FIGS. 28, 29A, 29B, 29C, 30, 31A, 31B, 32A, 32B, and 32C of the incorporated '509 provisional application. Such locking features are configured to engage with another locking feature for retention of a lid and/or retention ring onto the holster cup holder. The locking feature includes a receptacle for receipt of a lid locking feature. A retention ring may hold a bottle within a sleeve of the cup holder. The lid may include a spout and a cover for opening and closing a hole to selectively provide access to the liquid. In some aspects, insulation is provided to the beverage, maintaining cold beverages cold relative to the external environment, and maintaining hot beverages hot relative to the external environment. Similar to multi-lead threading, multiple locking features may be positioned about the holster cup holder to provide for quick attachment and detachment of a lid thereto. In some aspects, less than a single 360 degree, or less than a 180 degree, or less than a 90 degree, or less than a 45-degree turn is required to attached a lid to the holster cup holder.

One exemplary holster cup holder 5004 having locking features 5006 formed on a surface thereof is shown in FIGS. 19A-19C. Locking features 5006 are configured to engage with corresponding locking features 5006 on retention ring 5012. Bottle 5002 or other container may be inserted into holster cup holder 5004, as shown in FIG. 19B. Retention ring 5012 is positioned over bottle 5002, and locking features 5006 on retention ring 5012 are coupled with locking features 5006 on holster cup holder 5004. Retention ring 5012 defines an opening 5008 that is narrower than an opening of holster cup holder 5004, such that retention ring 5012 holds bottle 5002, having a narrow diameter, within a sleeve of holster cup holder 5004. Locking features 5006 may be or include threads, tabs or other featured configured to attached items.

Certain Embodiments

One aspect of the present disclosure includes a holster assembly. The holster assembly is suitable for use in retaining liquid containers. The holster assembly includes a holster clip and a holster cup holder. The holster clip and the holster cup holder are configured to be selectively attached and detached from one another.

Another aspect of the present disclosure includes the holster clip.

Another aspect of the present disclosure includes the holster cup holder.

Another aspect of the present disclosure includes a method of assembling and/or using the holster assembly. The method includes attaching the holster clip to a portion of clothing or accessory, attaching the holster cup holder to the holster clip, and inserting a liquid container within the holster cup holder.

An additional aspect of the present disclosure relates to a beverage container assembly. The beverage container assembly includes a beverage container. The beverage container includes a lid. Upon opening of the beverage container, the lid has an opening or spout formed through the lid. The beverage container assembly includes a cap coupled with the beverage container over the lid. The cap includes an opening or spout and second cap configured to be selectively opened and closed onto the opening or spout of the cap.

Some embodiments include a cap configured to be coupled with a can. The cap includes a cap body, the cap body including a lip and a cap edge opposite the lip. A cap lid is coupled to or integral with the cap body. An opening or spout is formed on or through the cap lid. A second cap is coupled to the opening or spout. The second cap is configured to be selectively opened and closed onto the opening or spout.

Certain embodiments include a method of providing a canned beverage with a selectively openable and closable cap. The method includes coupling a cap with a beverage can. The cap includes a cap body, the cap body including a lip and a cap edge opposite the lip. A cap lid is coupled to or integral with the cap body. An opening or spout is formed on or through the cap lid. A second cap is coupled to the opening or spout. The second cap is configured to be selectively opened and closed onto the opening or spout.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A holster assembly for use in retaining liquid containers, the holster assembly comprising:
   a holster, the holster comprising a body and a first coupler on a front side of the body, the body comprising a cylindrical mating surface on the front side thereof, wherein at least a portion of the cylindrical mating surface is spaced apart from the first coupler, wherein the cylindrical mating surface defines a concavity, wherein a curvature of the concavity is uniform from a top perimeter of the cylindrical mating surface to a bottom perimeter of the cylindrical mating surface;
   a holster cup holder, the holster cup holder having a convex outer surface, the holster cup holder comprising a second coupler on the convex outer surface, wherein at least a portion of the convex outer surface is spaced apart from the second coupler;
   wherein the first coupler and the second coupler are selectively attachable and detachable from one another; and
   wherein, with the first coupler attached to the second coupler, the cylindrical mating surface is in contact with the convex outer surface.

2. The holster assembly of claim 1, wherein the holster comprises a third coupler on a back side thereof, the third coupler selectively attachable and detachable onto an external structure.

3. The holster assembly of claim 2, wherein the external structure includes a wall, a table top, a belt loop, a belt, or another portion of clothing or accessory worn by a user.

4. The holster assembly of claim 2, wherein the third coupler is a clip, a magnetic surface, a suction cup, or a threaded coupler.

5. The holster assembly of claim 1, wherein the mating surface is configured to reduce the occurrence of the holster cup holder from moving relative to the holster.

6. The holster assembly of claim 1, wherein the cylindrical mating surface has a height that is equal to at least 90% of a total height of the holster.

7. The holster assembly of claim 1, wherein the first coupler includes a slot and a slot track, and wherein the second coupler includes a tab engageable within the slot and the slot track to selectively attach and detach the holster cup holder to the holster.

8. The holster assembly of claim 7, wherein a surface within the slot is magnetic, wherein a surface on the tab is magnetic, and wherein the magnetic surfaces of the slot and tab are positioned, sized, and arranged such that when the tab is inserted into the slot track, the magnetic surfaces magnetically engaged one another.

9. The holster assembly of claim 7, wherein the first coupler includes a locking clip positioned, sized, and arranged within the slot track such that when the tab is inserted into the slot track, the locking clip engages within a tab detent of the tab, locking the holster and the holster cup holder together.

10. The holster assembly of claim 9, wherein the holster further comprises a clip switch in operative engagement with the locking clip, wherein the locking clip is responsive to movement of the clip switch; wherein, when the clip switch is depressed, the locking clip is receded into a body of the holster, disengaging from within the tab detent; and wherein, when the clip switch is not depressed, the locking clip is extended out of the body and into the slot track engaging within the tab detent.

11. The holster assembly of claim 1, wherein the mating surface has a height that is equal to at least 70% of a total height of the holster.

12. The holster assembly of claim 1, wherein the holster includes a magnetic surface.

13. The holster assembly of claim 1, further comprising a holster mount selectively attachable and detachable with the holster.

14. The holster assembly of claim 13, wherein the holster mount includes a suction cup or magnet for coupling with external surfaces.

15. The holster assembly of claim 13, wherein the holster is pivotably coupled with the holster mount.

16. The holster assembly of claim 1, wherein the holster cup holder comprises a base having a slot thereon, the slot configured to engage with a tab for attachment to a surface.

17. The holster assembly of claim 1, wherein the concave mating surface is positioned below the first coupler.

18. A holster assembly for use in retaining liquid containers, the holster assembly comprising:

a holster, the holster comprising a body and a slot and slot track on a front side of the body, wherein the body comprises a cylindrical mating surface thereon, the cylindrical mating surface positioned below the slot and slot track on the front side of the body, and wherein the cylindrical mating surface has a height that is equal to at least 50% of a total height of the holster;

wherein the cylindrical mating surface defines a concavity, wherein a curvature of the concavity is uniform from a top perimeter of the cylindrical mating surface to a bottom perimeter of the cylindrical mating surface;

a holster cup holder, the holster cup holder comprising a convex outer surface and a tab on the convex outer surface thereof;

wherein the tab is selectively attachable and detachable from within the slot and slot track;

a coupler on a back side of the holster, the coupler selectively attachable and detachable onto an external structure;

wherein, with the tab engaged in the slot, the cylindrical mating surface is in contact with the outer surface.

19. An apparatus for holstering liquid containers, the apparatus comprising:

a holster, the holster comprising a first coupler and a cylindrical mating surface, wherein the cylindrical mating surface defines a concavity;

a holster cup holder, the holster cup holder comprising a second coupler and a convex outer surface;

wherein the first coupler and the second coupler are selectively attachable and detachable from one another; and wherein, with the first coupler attached to the second coupler, the cylindrical mating surface is in contact with the convex outer surface.

20. The apparatus of claim 19, wherein a curvature of the concavity is uniform from a top perimeter of the cylindrical mating surface to a bottom perimeter of the cylindrical mating surface.

* * * * *